J. F. KELLY.
SINK.
APPLICATION FILED NOV. 24, 1908.
917,454. Patented Apr. 6, 1909.
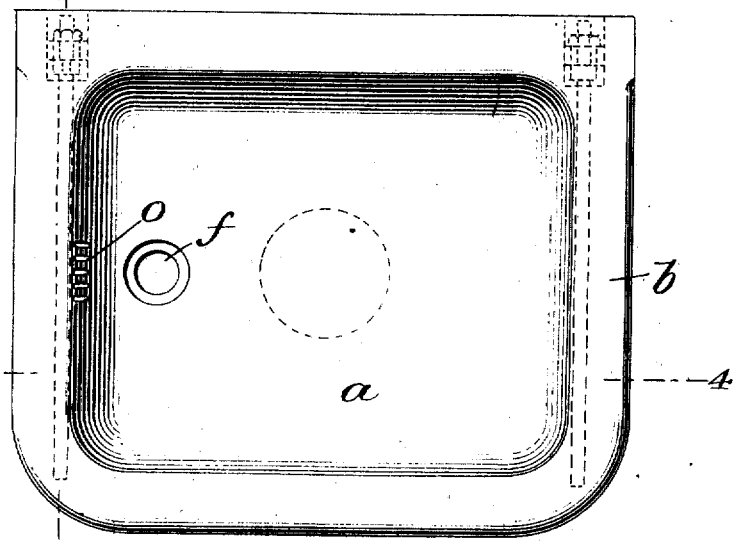
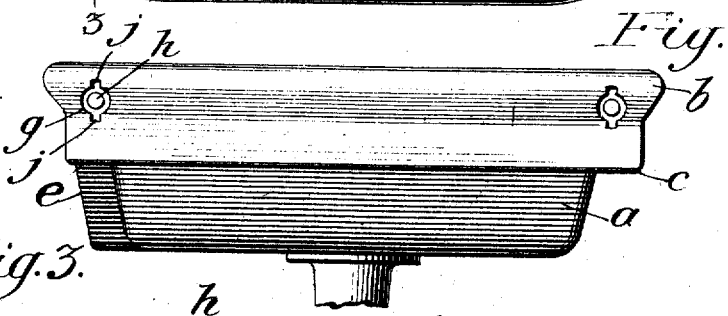
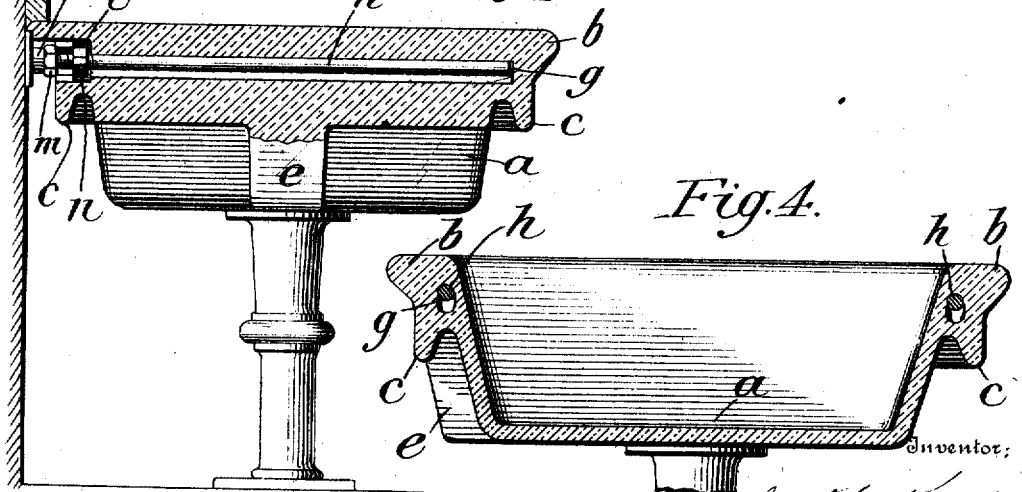

UNITED STATES PATENT OFFICE.

JOHN F. KELLY, OF TRENTON, NEW JERSEY.

SINK.

No. 917,454.

Specification of Letters Patent.

Patented April 6, 1909.

Application filed November 24, 1906. Serial No. 344,993.

*To all whom it may concern:*

Be it known that I, JOHN F. KELLY, a citizen of the United States, residing at Trenton, in the county of Mercer and the State of New Jersey, have invented certain new and useful Improvements in Sinks; and I do hereby declare the following to be a full, clear, and exact description of the invention, such as will enable others skilled in the art to which it appertains to make and use the same.

The invention relates to sinks formed of vitreous ware or like plastic material and has for its object to provide a sink of such character that it may be successfully produced from plastic material, which is subsequently baked or fired, which will not be subject to warping or cracking during the baking process.

The invention also contemplates the production of a sink of the character referred to, in which the means for strengthening the body of the sink, against warping strains also serves the incidental purpose of providing a drip-shield which will prevent the water, which inevitably finds its way over the edge of the sink, from flowing down along the sides thereof to the supports or other attachments, as in the common forms of metallic sinks.

Incidentally the construction affords a particularly efficient means for supporting and securing the sink to a wall or other stationary member so as to avoid the use of external brackets, legs or the like which serve to accumulate moisture and dirt and are generally unsightly and unsanitary.

In the accompanying drawings, Figure 1 is a plan view of a sink embodying my invention; Fig. 2 is a rear elevation thereof; Fig. 3 is a transverse section on line 3—3 of Fig. 1; Fig. 4 is a longitudinal section on line 4—4 of Fig. 1.

It has been frequently proposed by potters, to produce sinks of porcelain, clay, vitreous ware or other plastic material, but, owing to the peculiar shape and relative proportions of the sink bowl and the encompassing rim, it has been found impossible to avoid warping and cracking of the sink in the operation of baking or burning the same in the usual pottery kilns. For this reason the manufacture of plastic ware sinks of the ordinary form, has never been successfully pursued, and, while there is a great demand for such articles, on account of their cleanliness and capability of maintenance in general sanitary condition, yet the difficulties of manufacture have been such as to prevent the demand being met. The present invention, however, renders it possible to produce a sink that is relatively light in weight, that can be effectively fired or baked without danger of warping or cracking, that is adapted to be secured in place by supports that are entirely concealed and inaccessible to dirt and moisture, and that will also prevent any water which may escape over its edge finding its way into inaccessible places where it would tend to produce unsanitary conditions.

In the drawings *a* indicates the bowl or basin of the sink, which is preferably formed as a generally rectangular receptacle having downwardly tapering sides and a flat bottom. Surrounding the upper edge of the sink body *a* is a rim *b* which is formed as an integral part of the body *a*. Owing to the relative thickness of the rim *b*, it has heretofore been found impossible to successfully bake or burn plastic ware sinks for the reason that the material shrinks considerably in the baking process, and, owing to the unequal rate of drying and shrinking of the basin and the rim, the latter almost inevitably pulls away from the bowl leaving the latter to warp and frequently crack, and, in any event, rendering the sink unfit for use. In making up sinks in accordance with the present invention I prefer to use vitreous ware and to form the entire sink as a unitary, homogeneous structure of the material while in a plastic condition, and subsequently to bake or burn the same in the ordinary form of kiln to harden it, and, afterward, if necessary, to glaze and again fire it in the furnace, as is customary in the manufacture of goods from such ware.

In order to prevent warping or cracking of the basin and the rim, I strengthen the latter by means of a pendent flange *c* which is preferably extended around the entire sink and affords an effectual brace or connection between the rim *b* and the body *a* of the sink. The pendent flange *c* also affords a drip shield inasmuch as it prevents any water which runs over the rim *b* reaching the under side of the body *a*, but all such water, on the contrary, which gathers on such flange *c*, drops off on to the floor where it may be readily removed. Inasmuch as the flange *c* prevents water gathering on the lower surface of the sink body *a* it will be apparent that the water cannot gather on the supports or connections to the sink to corrode the same and produce unsanitary conditions.

The arrangement of the rim b and the drip shield c enables the sink to be provided with supporting means which are wholly concealed, thereby obviating the unsightly wall brackets or corner legs which are so generally employed. To accomplish this the material forming the rim b and the pendent flange c, on the sides of the sink is made hollow for substantially the whole length of the rim, as illustrated in Figs. 1 and 3. The recess g thus formed is adapted to receive a bracket arm h which is secured in a suitable socket l on the wall or other support, and, as one of these brackets is located at each side of the sink, it will be observed that the sink is effectively held in position and that its supports are not only entirely concealed from view but are in such position as to prevent dirt, moisture or the like from accumulating thereon. As an additional measure of security the bracket arms h may be locked to the sink by means of a wing nut n which passes through a suitably shaped orifice j, at the rear of the recess g and an outside lock nut m. The wing nut n forms with the recess j a species of bayonet joint, the wings of the nut passing through lateral enlargements of the recess j, the nut then being turned to cause the wings thereof to engage the walls of the recess, after which the set nut m is turned up against the outer face of the rear rim.

Ordinarily the form of bracket support just described will be found sufficient to support the sink, but, if desired, the latter may be furnished with a central pedestal or with legs set under the bottom portion thereof.

The body of the sink has a waste opening f, which may be provided with a suitable stopper or valve to enable the sink to hold water, and, when used in this manner, an overflow o, connected by an external duct e, with the waste, prevents the water flooding the sink.

When applied to a wall the sink is provided with a splash board s which may be formed separately or as an integral portion of the sink, as desired. Under all conditions of use, however, it will be noted that the sink presents a neat and graceful appearance without the cumbrousness of the very heavy fire-clay sinks which have been used to some extent, and, moreover, are cleanly and sanitary, in that they are accessible in all parts for thorough cleaning and do not present the usual pockets, angles and recesses for the accumulation of moisture and dirt which are the necessary adjuncts of the ordinary form of sinks, but, on the other hand, afford a clean unbroken surface on the interior and exterior, which in conjunction with the drip shield c prevents the water running down on the outer side of the body a to accumulate about the supports and cause the latter to become unsightly and even to deteriorate.

What I claim as my invention is:

1. A sink of vitreous ware or the like having a roll rim and a drip shield depending therefrom, the rim being provided with inclosed recesses running longitudinally of the sink sides to receive and inclose the arms of supporting brackets.

2. The combination with a sink of vitreous ware or the like provided with inclosed longitudinal recesses in its lateral edges, of rod like brackets adapted to be secured to a wall or like support and projecting within said recesses.

3. The combination with a sink of vitreous ware or the like having a depending drip shield about its edge, and provided with inclosed longitudinal recesses in its lateral edges, of rod like brackets adapted to be secured to a wall or like support and projecting within said recesses.

In testimony whereof I affix my signature in presence of two witnesses.

JOHN F. KELLY.

Witnesses:
 CHAS. J. O'NEILL,
 R. C. CRUIT.